United States Patent
Rutherford et al.

(10) Patent No.: US 11,244,296 B2
(45) Date of Patent: Feb. 8, 2022

(54) METHOD AND SYSTEM FOR AUTHENTICATION VIA A TRUSTED EXECUTION ENVIRONMENT

(71) Applicant: Mastercard International Incorporated, Purchase, NY (US)

(72) Inventors: Bruce John Rutherford, Stamford, CT (US); Prashant Sharma, Madison, NJ (US); David Cutler, Tervuren (BE); Alan Mushing, Cheshire (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 72 days.

(21) Appl. No.: 15/877,613

(22) Filed: Jan. 23, 2018

(65) Prior Publication Data

US 2018/0211236 A1 Jul. 26, 2018

Related U.S. Application Data

(60) Provisional application No. 62/449,390, filed on Jan. 23, 2017.

(51) Int. Cl.
*G06Q 20/10* (2012.01)
*G06Q 20/40* (2012.01)
(Continued)

(52) U.S. Cl.
CPC ....... *G06Q 20/105* (2013.01); *G06Q 20/3227* (2013.01); *G06Q 20/3821* (2013.01);
(Continued)

(58) Field of Classification Search
None
See application file for complete search history.

(56) References Cited

U.S. PATENT DOCUMENTS

| 2008/0207124 | A1* | 8/2008 | Raisanen | G06F 21/70 |
| | | | | 455/41.2 |
| 2014/0373170 | A1* | 12/2014 | Brudnicki | H04L 63/102 |
| | | | | 726/27 |
| 2016/0117683 | A1* | 4/2016 | Jung | H04L 63/0853 |
| | | | | 705/44 |

(Continued)

FOREIGN PATENT DOCUMENTS

WO 2017/190633 A1 11/2017

OTHER PUBLICATIONS

Global Platform Card Technology, Card Specification—ISO Framework, version 1.0. Mar. 2014 (Year: 2014).*
https://en.wikipedia.org/wiki/Trusted_execution_environment, as captured by Web.Archive.org Dec. 25, 2016 (Year: 2016).*

(Continued)

*Primary Examiner* — Eric T Wong
*Assistant Examiner* — Claire A Rutiser
(74) *Attorney, Agent, or Firm* — Buchanan Ingersoll & Rooney PC

(57) ABSTRACT

A method for authentication facilitated via a trusted execution environment includes: reading payment credentials in a first application program stored in a first memory area of a computing device; transmitting an authentication request to a second application program stored in a trusted execution environment of the computing device separate from the first memory area; displaying a prompt for authentication data based on an instruction supplied by the second application program; receiving authentication data; transmitting the received authentication data to an external computing device; receiving, by the second application program of the computing device, an authentication result from the external computing device; and transmitting, by the second application program of the computing device, the authentication (Continued)

result to the first application program in response to the authentication request.

12 Claims, 6 Drawing Sheets

(51) Int. Cl.
    *G06Q 20/38*     (2012.01)
    *H04L 29/06*     (2006.01)
    *G06Q 30/06*     (2012.01)
    *G06Q 20/32*     (2012.01)
    *G07F 7/08*     (2006.01)

(52) U.S. Cl.
    CPC ....... *G06Q 20/40145* (2013.01); *G06Q 30/06* (2013.01); *G07F 7/0886* (2013.01); *H04L 63/0428* (2013.01); *H04L 63/0853* (2013.01); *H04L 63/0861* (2013.01)

(56) References Cited

U.S. PATENT DOCUMENTS

| | | | | |
|---|---|---|---|---|
| 2016/0132861 A1* | 5/2016 | Fontaine | ............... | G06Q 20/327 705/41 |
| 2016/0253670 A1* | 9/2016 | Kim | .................. | G06Q 20/3255 705/72 |

OTHER PUBLICATIONS

Mobeewave: "Trustonic and Mobeewave Partner to Provide Unprecedented Security Level in Mobile Payment" (XP055463657) Apr. 15, 2015 URL:http://www.mobeewave.com/en/2015/04/15/trustonic-and-mobeewave-partner-to-provide-unprecedented-security-level-in-mobile-payment-2/ [Retrieved Mar. 28, 2018].

Globalplatform: The Trusted Execution Environment: Delivering Enhanced Security as a Lower Cost to the Mobile Market. Jun. 1, 2005 (XP055463655) Retrieved from the internet: URL:https://www.globalplatform_TEE_Whitepaper_2015.pdf [Retreived Mar. 28, 2018].

Notification of Transmittal of the International Search Report and the Written Opinion of the International Searching Authority (Forms PCT/ISA/220, PCT/ISA/210 and PCT/ISA237) dated Apr. 10, 2018, by the European Patent Office in corresponding International Application No. PCT/US2018/014786. (13 pages).

Office Action (First Examination Report) dated Sep. 23, 2021, by the Patent Office, Government of India, in corresponding India Patent Application No. 201911034246 with an English Translation of the Office Action. (6 pages).

Office Action (Communication pursuant to Article 94(3) EPC) dated Nov. 10, 2021, by the European Patent Office in corresponding European Patent Application No. 18 702 887.3-1213. (7 pages).

* cited by examiner

US 11,244,296 B2

METHOD AND SYSTEM FOR AUTHENTICATION VIA A TRUSTED EXECUTION ENVIRONMENT

FIELD

The present disclosure relates to authentication performed via a trusted execution environment, specifically the conversion of a computing device into a point of sale device through the use of multiple application programs including an application program stored in a trusted execution environment.

BACKGROUND

Traditional point of sale devices are specialized computing machines that can often be expensive to purchase and difficult to set up and use, particularly for small business. As such, many individuals or small operations that are interested in selling a product will often stick to cash transactions, lacking a point of sale system for the reading and processing of credit cards and other payment instruments. In an effort to facilitate these types of transactions for small businesses, products have been developed that can convert a traditional computing device, such as a desktop computer, tablet computer, or smart phone, into a point of sale device. Often times, these products utilize a hardware element interfaced with the computing device, as well as an application program loaded on and executed by the computing device.

While these types of products successfully read payment credentials from payment instruments and submit them as part of a payment transaction, similar to traditional point of sale devices, they utilize standard memory and processing techniques of computing devices. As such, they are susceptible to hacking and being compromised in a manner that may place sensitive payment information at risk. In cases where a consumer may be required to provide authentication information, such as a personal identification number or signature, there is a greater risk of consumer data being compromised, such as during data capture from a native input device.

Thus, there is a need for a technical solution whereby application programs and payment instrument device reading hardware can take advantage of trusted execution environments on computing devices to provide for authentication to be performed at a higher level of security.

SUMMARY

The present disclosure provides a description of systems and methods for authentication facilitated via a trusted execution environment. A computing device uses a payment instrument reading device and associated application program along with a second application program that is stored in and executed via a trusted execution environment in the computing device that handles all of the authentication data, such that a computing device may utilize existing payment instrument reading device hardware and software and still have extra authentication being performed. The use of a trusted execution environment may ensure that extra authentication is performed successfully and at a higher level of security with less opportunity for the data to be compromised, and without requiring modification to payment instrument reading devices and associated software.

A method for authentication facilitated via a trusted execution environment includes: reading, by an instrument reading device interfaced with a computing device, payment credentials stored in a payment instrument, wherein the payment credentials are electronically transmitted to a first application program, the first application program having program code stored in a first memory area of the computing device; electronically transmitting, by the first application program of the computing device, an authentication request to a second application program, the second application program having program code stored in a trusted execution environment of the computing device separate from the first memory area; displaying, by a display device interfaced with the computing device, a prompt for authentication data based on an instruction supplied by the second application program; receiving, by an input device interfaced with the computing device, authentication data, wherein the authentication data is electronically transmitted to the second application program; electronically transmitting, by the second application program of the computing device, the received authentication data to an external computing device; receiving, by the second application program of the computing device, an authentication result based on the transmitted authentication data from the external computing device; and electronically transmitting, by the second application program of the computing device, the authentication result to the first application program in response to the authentication request.

A system for authentication facilitated via a trusted execution environment includes: an instrument reading device interfaced with a computing device configured to read payment credentials stored in a payment instrument; a first application program of the computing device configured to receive the read payment credentials from the instrument reading device, and to electronically transmit an authentication request to a second application program, wherein the first application program has program code stored in a first memory area of the computing device and the second application program has program code stored in a trusted execution environment of the computing device separate from the first memory area; a display device interfaced with the computing device configured to display a prompt for authentication data based on an instruction supplied by the second application program; and an input device interfaced with the computing device configured to receive authentication data, wherein the authentication data is electronically transmitted to the second application program, wherein the second application program is configured to electronically transmit the received authentication data to an external computing device, receive an authentication result based on the transmitted authentication data from the external computing device, and electronically transmit the authentication result to the first application program in response to the authentication request.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
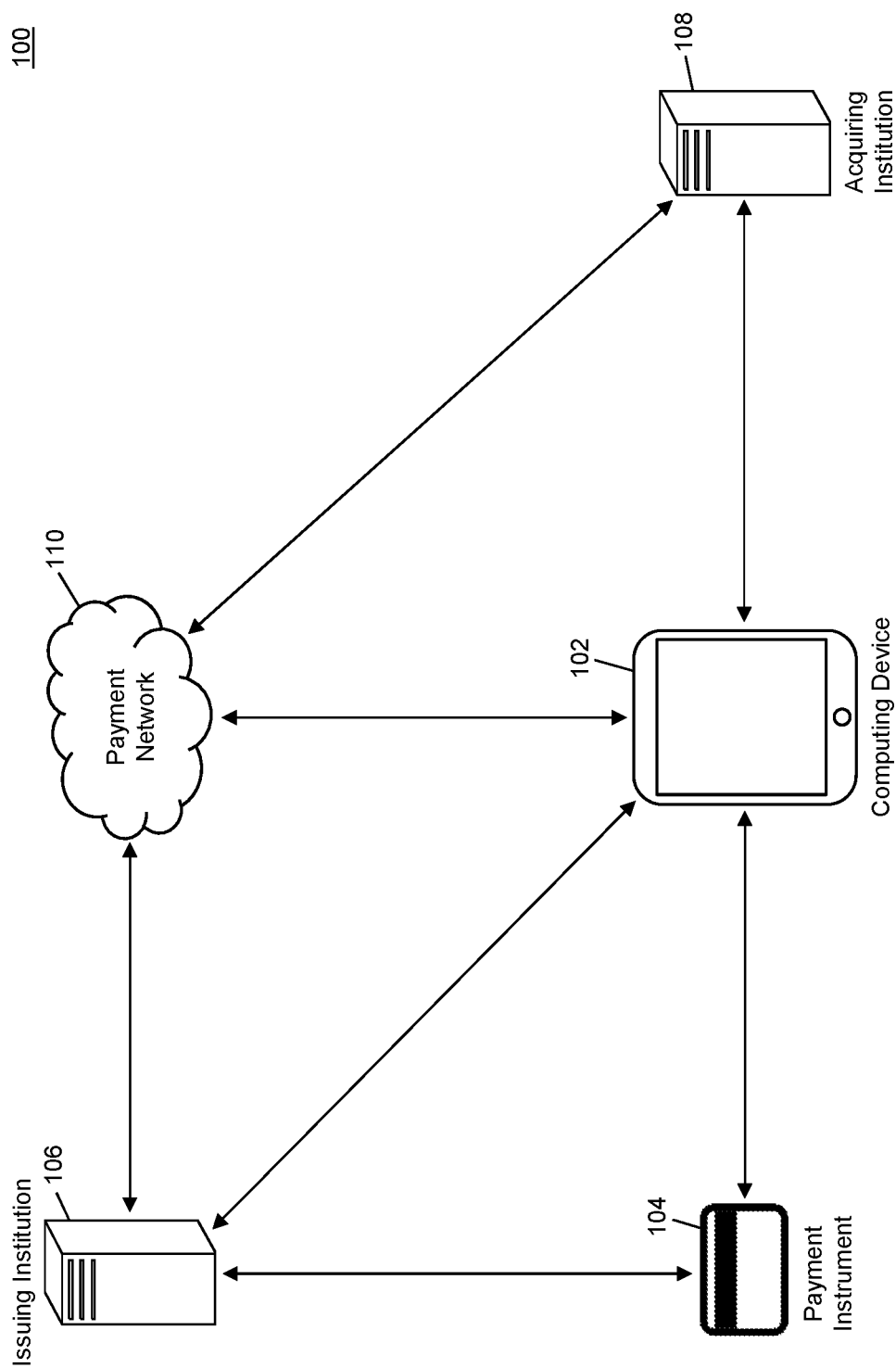
FIG. 1 is a block diagram illustrating a high level system architecture for authentication in a payment transaction facilitated via a trusted execution environment in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

System for Authentication Via a Trusted Execution Environment

FIG. 1 illustrates a system 100 for the processing of a payment transaction via the use of a computing device as a point of sale device including the use of a trusted execution environment for the performing of authentication associated therewith separate from the reading and processing of payment credentials.

The system 100 may include a computing device 102. The computing device 102, discussed in more detail below, may be a traditional computing device that is specially configured and programmed as discussed herein to operate as a point of sale device for the processing of an electronic payment transaction. The computing device 102 may be, for example, a specifically configured desktop computer, laptop computer, notebook computer, tablet computer, cellular phone, smart phone, smart television, etc. The computing device 102 may be interfaced with a payment instrument reading device, which may be configured to read payment credentials and other data from a payment instrument 104. Payment credentials may include a transaction account number, expiration date, name, security code, transaction counter, cryptogram, and/or any other data used in the processing of a payment transaction for funding via a transaction account associated therewith. The payment instrument reading device may be configured to read payment credentials via the decoding of data encoded in a magnetic stripe, the receipt of data via electronic transmission from an integrated circuit, receipt of data via electronic transmission using near field communication, and any other suitable method for the conveyance of payment credentials from a payment instrument 104. Payment instruments 104 may include, for instance, magnetic strip payment cards, integrated circuit payment cards, mobile devices with electronic wallet application programs, checks, etc.

The payment instrument 104 may be issued by an issuing institution 106. The issuing institution 106 may be a financial institution, such as an issuing bank, or other entity that is configured to issue payment instruments for transaction accounts for use in funding electronic payment transactions. The issuing institution 106 may be configured to determine approval or denial of a payment transaction that is to be funded via a transaction account managed by the issuing institution 106. In some instances, the issuing institution 106 may specify rules or guidelines for payment transactions and when authentication must be performed as part of the processing of a payment transaction, such as requiring additional authentication for payment transactions over $50.

The computing device 102 may be store a first application program that is associated with the payment instrument reading device interfaced therewith. The first application program may be configured to receive the payment credentials from the payment instrument 104 via the payment instrument reading device, may be configured to perform any processing thereof (e.g., calculation of payment cryptograms), and may be configured to submit the read payment credentials and other transaction data to an acquiring institution 108 for processing thereby. The first application program may be stored in a memory of the computing device 102, which may be a standard memory of the computing device 102.

The computing device 102 may identify when additional authentication is required to be performed for a payment transaction. In some cases, additional authentication may be performed for every transaction, or may be performed based on specific criteria associated with a transaction. For instance, the issuing institution 106 that issues the payment instrument 104 may provide criteria setting forth when additional authentication is required, such as based on the transaction amount for the transaction. In some such instances, the criteria may be provided to the first application program prior to a transaction. In other such instances, the criteria may be stored in the payment instrument 104 and conveyed to the first application program with the payment credentials.

When additional authentication is requested, the first application program may submit an authentication request to a second application program stored in the computing device 102. The second application program may be stored in a trusted execution environment. The trusted execution environment may be a specialized memory or area of memory in the computing device 102 that is quarantined from the rest of the computing device 102 that may be only be modified or accessed using specialized rules and protocols. For instance, the trusted execution environment may be a Secure Element or other hardware-based secured storage, and all communications made to and from the trusted execution environment may be encrypted. In some instances, the trusted execution environment may be software-based. The first application program may thus submit an authentication request to the second application program, wherein the authentication request is encrypted, such as using a first key of a key pair, where the second application program possesses the second key of the key pair for decryption of the authentication request. The authentication request may include at least the primary account number associated with the transaction account corresponding to the payment instrument 104.

In some embodiments, the second application program may be configured to only perform authentications for authorized first application programs. In such embodiments, the second application program may possess or have access to a registry of authorized first application programs. An entity associated with the second application program (e.g., a developer, publisher, operator, etc.) may determine if a first application program should be authorized, such as after ensuring compliance with security standards, review of associated hardware (e.g., payment instrument reading devices), etc. For example, the entity may ensure that the first application program is not subject to compromise that may also compromise the authentication data captured by the computing device 102 and transmitted to the second application program. The registry may be stored locally in the computing device 102, such as in the trusted execution environment with the second application program, or may be remotely accessible, such as by contacting computing systems associated with the entity. In such embodiments, the authentication request submitted to the second application program may include a unique identification value associated with the first application program submitting the request. The second application program may, using the identification value, determine if the first application program is authorized, such as by comparing it to the internal registry or contacting the external computing system. If the first application program is not authorized, the second application program may not proceed. If the first application program is authorized, the second application program may proceed with the authentication.

The second application program may receive the authentication request and decrypt the request to identify the data stored therein. The second application program may then prompt a consumer to supply authentication data. The prompt may utilize a display device interfaced with the computing device 102 to display a prompt to the consumer to supply a specific type of data for authentication thereof. The consumer may then supply authentication data via an input device interfaced with the computing device 102. Authentication data may include, for instance, a personal identification number, signature, biometric data (e.g., fingerprint, facial scan, retinal scan, vocal signal, etc.), password, or any other data that may be used to authenticate the consumer as an authorized user of the payment instrument 104. In some cases, multiple types of authentication may be used (e.g., a personal identification number in combination with a fingerprint). In some embodiments, the prompt and other interface elements utilized by the second application program may be visually distinguished from interfaces provided by the first application program, such as to indicate to the user that a separate application program is being used for authentication. In some such embodiments, the visually distinguishing features may convey the use of additional security.

The second application program may receive the authentication data (e.g., via encrypted transmission from the computing device's input device) and may perform authentication. In one embodiment, the second application program may perform authentication via the issuing institution 106. In such embodiments, the second application program may electronically transmit (e.g., via a transmitting device of the computing device 102) the received authentication data and primary account number to the issuing institution 106. In such instances, the transmission may be directly to the issuing institution 106, which may be identified via the primary account number, or may be to an acquiring institution 108 and/or payment network 110, which may forward the authentication data to the issuing institution 106. In many cases, the authentication data may be encrypted prior to transmission, for decryption by the issuing institution 106. The issuing institution 106 may receive the authentication data and may authenticate the data, such as by comparing it to data previously provided by the consumer and associated with the transaction account. For example, the issuing institution 106 may compare a fingerprint captured by the computing device 102 with one previously registered to the transaction account corresponding to the payment instrument 104. The issuing institution 106 may then electronically transmit a result of the authentication back to the computing device 102 (e.g., directly or via the payment network 110 and/or acquiring institution 108).

In some embodiments, the computing device 102 may electronically transmit the primary account number (e.g., encrypted) to the issuing institution 106 without the authentication data. In such embodiments, the issuing institution 106 may identify the previously registered authentication data associated with the transaction account, identified via the primary account number, and may return the authentication data to the computing device 102. The computing device 102 may then compare the received authentication data with the authentication data input by the consumer to generate the authentication result. In yet another embodiment, the computing device 102 may request authentication data directly from the payment instrument 104, via the payment instrument reading device, which may obtain the authentication data stored in the payment instrument 104. In such an embodiment, the payment instrument reading device may read the authentication data from the payment instrument 104 and forward it to the second application program, which may then determine the authentication result based thereon.

Once the second application program identifies an authentication result (e.g., determined thereby or received from the issuing institution 106), the second application program may provide the authentication result to the first application program. The first application program may then decide to proceed with the payment transaction based thereon. For instance, if the authentication result is negative (e.g., the authentication failed), then the first application program may prevent further processing of the payment transaction, and may instruct the display device to inform the consumer of the failed authentication. If the authentication result is positive (e.g., authentication was successful), then the first application program may submit the payment credentials and other transaction data to the payment network 110 for processing. In such cases, the payment credentials and other transaction data (e.g., transaction amount, transaction time, transaction date, geographic location, product data, merchant data, offer data, reward data, loyalty data, issuer data, acquiring data, etc.), may be transmitted directly to the payment network 110 via payment rails associated therewith, or via an acquiring institution 108. The acquiring institution 108 may be a financial institution, such as an acquiring bank, or other entity configured to manage a transaction account associated with a merchant to whom the transaction is being paid. In some embodiments, transmissions made to the payment network 110, or to any computing system, server, or other backend from the computing device 102 and/or to the payment network 110 may be made in compliance with the payment card industry (PCI) data security standard (DSS).

The payment network 110 may then process the payment transaction using traditional methods and systems. As part of the processing, the payment network 110 may provide the payment credentials and other transaction data to the issuing institution 106, which may determine if the transaction is approved or denied based on criteria that will be apparent to persons having skill in the relevant art. A result of the processing (e.g., the approval or denial of the transaction) may be electronically transmitted back to the computing device 102 (e.g., directly from the payment network 110 or via the acquiring institution 108). The computing device 102 may display the result to the consumer via the interfaced display device, and may perform any additional functions as required (e.g., printing of a receipt, updating of a transaction record, etc.).

In some embodiments, the computing device 102 may be configured to encrypt data prior to transmission. For instance, the payment credentials read by the computing device 102 may be encrypted prior to transmission of the transaction data to the payment network 110 or other system (e.g., acquiring institution 108, backend server, etc.), such that only the intended recipient may be able to decrypt the data. For instance, the payment network 110 may supply the computing device 102 with a public key of a cryptographic key pair for which the payment network 110 possess the corresponding private key. The computing device 102 may use the public key to encrypt the payment credentials, which may only be decrypted using the private key possessed by the payment network 110. In some cases, the computing device 102 and other systems in communication therewith (e.g., the payment network 110, acquiring institution 108, etc.) may use a mutual authentication process during the establishing of communications, prior to the transmission of any data, for added security. In some embodiments, the payment network 110 or other backend system may require that the computing device 102 not be rooted or jail-broken in order to participate in the system 100, or may otherwise perform security checks to ensure that the computing device 102 has not been compromised and is in compliant with any applicable security standards. In some such embodiments, such checks may be performed as part of a mutual authentication process involving the computing device 102. In some instances, authentication of the computing device 102 may also, or alternatively, include validation or authentication of the first and/or second application program executed by the computing device 102.

The methods and systems discussed herein may thus enable a computing device 102 to be specially configured using a second application program and a trusted execution environment to be able to perform additional authentication for payment transactions in conjunction with an interfaced payment instrument reading device and associated application program. As a result, a traditional computing device 102 equipped with a trusted execution environment may be specially configured using the methods and systems discussed herein to enable payment transactions to be processed with additional authentication, without modification to existing payment instrument reading devices while still allowing for more secure processing of payment transactions.

Computing Device

Figure 2:
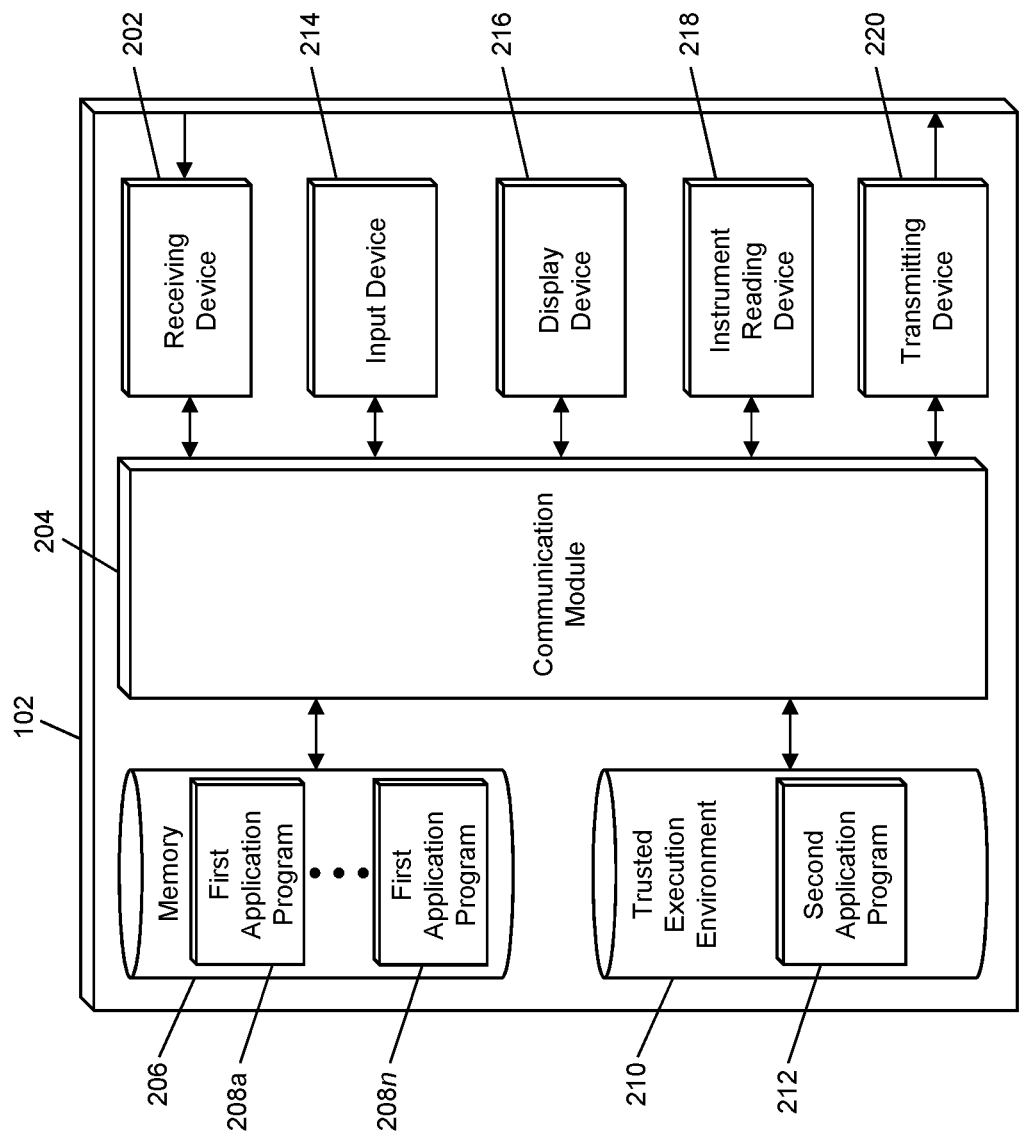
FIG. 2 is a block diagram illustrating the computing device of the system of FIG. 1 for authentication via a trusted execution environment in a payment transaction in accordance with exemplary embodiments.

FIG. 2 illustrates an embodiment of a computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein. For example, the computer system 600 illustrated in FIG. 6 and discussed in more detail below may be a suitable configuration of the computing device 102.

The computing device 102 may include a receiving device 202. The receiving device 202 may be configured to receive data over one or more networks via one or more network protocols. In some instances, the receiving device 202 may be configured to receive data from payment instruments 104, issuing institutions 106, acquiring institutions 108, payment networks 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuing institutions 106 via a suitable communication network and method that are superimposed or otherwise encoded with authentication data and/or an authentication result. The receiving device 202 may also be configured to receive data signals electronically transmitted by acquiring institutions 108 and/or payment networks 110, which may be superimposed or otherwise encoded with transaction messages. Transaction messages may be specially formatted data messages, which may be formatted pursuant to one or more standards governing the exchange of financial transaction messages, such as the International Organization of Standardization's ISO 8583 and ISO 20022 standards, and may include transaction data for a payment transaction, including a response code indicating a result of the processing of the related payment transaction.

The computing device 102 may also include a communication module 204. The communication module 204 may be configured to transmit data between modules, engines, databases, memories, and other components of the computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 102 and external components of the computing device 102, such as externally connected databases, display devices, input devices, etc. The computing device 102 may also include a processing device. The processing device may be configured to perform the functions of the computing device 102 discussed herein as will be apparent to persons having skill in the relevant art. In some embodiments, the processing device may include and/or be comprised of a plurality of engines and/or modules specially configured to perform one or more functions of the processing device, such as a querying module, data identification module, generation module 18, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing device 102 may include a memory 206. The memory 206 may be configured to store data for use by the computing device 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the computing device 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein.

The memory 206 may be configured to store one or more first application programs 208. The first application program 208 may be configured to receive payment credentials from a payment instrument 104 and perform functions associated with the processing and use thereof in a payment transaction. The first application program 208 may also be configured to submit authentication requests to a second application program 212 of the computing device 102, for additional authentication in a payment transaction. In some such cases, the first application program 208 may identify when additional authentication should be requested, which may be done based on criteria provided by an issuing institution 106 and/or payment instrument 104, which may be stored in the memory 206. Program code for the first application program 208 may be stored in the memory 206, which may be executed by the processing device of the computing device 102.

In some embodiments, a computing device 102 may include multiple first application programs 208, such as an n number of first application programs 208 as illustrated in FIG. 2. In such embodiments, each first application program 208 may have a unique identification value associated therewith that may be included in authentication requests submitted to the second application program 212. In some such embodiments, each first application program 208 may be pre-authorized by an entity associated with the second application program 212 to be allowed to request authentications be performed by the second application program 212. As discussed herein, the first application program 208 may be used in the processing of a payment transaction funded via a payment instrument 104. However, the first application program 208 may also, or alternatively, be any program where authentication of a user of the computing device 102 may be performed on behalf thereof, which may utilize third party data (e.g., such as provided by the payment instrument 104 or issuing institution 106 in the illustrated example). For example, a customs agency may have a first application program 208 used for processing entrants into a country, where the second application program 208 may authentication visitors based on presented identification, where the authentication data may be stored in the presented identification (e.g., a passport) or an external computing system (e.g., the issuing government).

The computing device 102 may also include a trusted execution environment 210. The trusted execution environment 210 may be a distinct portion of the memory 206 or may be a separate memory of the computing device 102. In some cases, the trusted execution environment 210 may be a separate hardware element of the computing device 102, such as a Secure Element. The trusted execution environment 210 may be hardware-based, or, in some cases, may be implemented via software. The trusted execution environment 210 may be a secure area where data stored therein is protected with respect to confidentiality and integrity of the data. In some instances, communications to and from the trusted execution environment 210 may be subject to one or more protocols or standards set forth thereby, such as requiring a level of encryption for all incoming and outgoing communications.

The trusted execution environment 210 may be configured to store the program code for the second application program 212, which may be executed by the processing device of the computing device 102. The second application program 212 may be configured to obtain authentication data from a consumer, which may be received only by the second application program 212 and prohibited for usage by the first application program 208. The second application program 212 may also be configured to obtain authentication data and/or an authentication result from the issuing institution 106 and authentication data from a payment instrument 104. The second application program 212 may also be configured to determine an authentication result from authentication data received from the consumer and from an issuing institution 106 and/or payment instrument 104. In some embodiments, the second application program 212 may include a registry of authorized first application programs 208, which may include unique identification values for each authorized first application program 208, and where the second application program 212 may ensure a first application program 208 is authorized before performing authentication as requested thereby. In some cases, the second application program 212 may be configured to request authorization status and/or receive authorization updates from an external computing system, for use as an alternative to or for updating the registry.

The computing device 102 may also include or be otherwise interfaced with one or more input devices 214. The input devices 214 may be internal to the computing device 102 or external to the computing device 102 and connected thereto via one or more connections (e.g., wired or wireless) for the transmission of data to and/or from. The input devices 214 may be configured to receive input from a user of the computing device 102, which may be provided to another module or engine of the computing device 102 (e.g., via the communication module 204) for processing accordingly. Input devices 214 may include any type of input device suitable for receiving input for the performing of the functions discussed herein, such as a keyboard, mouse, click wheel, scroll wheel, microphone, touch screen, track pad, camera, optical imager, etc. The input device 214 may be configured to, for example, receive authentication data input by a consumer, such as a personal identification number, signature, biometric data, etc.

The computing device 102 may also include or be otherwise interfaced with a display device 216. The display device 216 may be internal to the computing device 102 or external to the computing device 102 and connected thereto via one or more connections (e.g., wired or wireless) for the transmission of data to and/or from. The display device 216 may be configured to display data to a user of the computing device 102. The display device 216 may be any type of display suitable for displaying data as part of the functions discussed herein, such as a liquid crystal display, light emitting diode display, thin film transistor display, capacitive touch display, cathode ray tube display, light projection display, etc. In some instances, the computing device 102 may include multiple display devices 216. The display device 216 may be configured to, for example, display a prompt to a consumer requesting that authentication data may be supplied, which may further indicate the type of authentication data to be supplied. The display device 216 may also be configured to display an authentication result and/or a result of the processing of a payment transaction.

The computing device 102 may also include an instrument reading device 218. The instrument reading device 218 may be a device interfaced with the computing device 102 that is configured to read payment credentials and other data from a payment instrument 104. The instrument reading device 218 may be internal to the computing device 102 or may be external and connected via a suitable physical or non-physical connection to the computing device 102. The instrument reading device 218 may be configured to read data encoded in magnetic strips, receive data electronically transmitted via integrated circuits, receive data electronically transmitted via near field communications, read data encoded in displayed machine-readable codes, or use any other suitable method for the reading of payment credentials from a payment instrument 104.

The computing device 102 may also include a transmitting device 220. The transmitting device 220 may be configured to transmit data over one or more networks via one or more network protocols. In some instances, the transmitting device 220 may be configured to transmit data to payment instruments 104, acquiring institutions 108, issuing institutions 106, payment networks 110, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to payment instruments 104 (e.g., via the instrument reading device 218) that are superimposed or otherwise encoded with requests for authentication data. The transmitting device 220 may also be configured (e.g., as instructed by the second application program 212) to electronically transmit data signals to issuing institutions 106 that are superimposed or otherwise encoded with authentication requests, which may include primary account numbers and authentication data. The transmitting device 220 may be further configured (e.g., as instructed by the first application program 208) to electronically transmit data signals to acquiring institutions 108 and/or payment networks 110, which may be superimposed or otherwise encoded with payment credentials and other transaction data, which may be included in a transaction messaged formatted pursuant to one or more standards, including the ISO 8583 and ISO 20022 standards.

First Process for Authentication of a Payment Transaction

Figure 3:
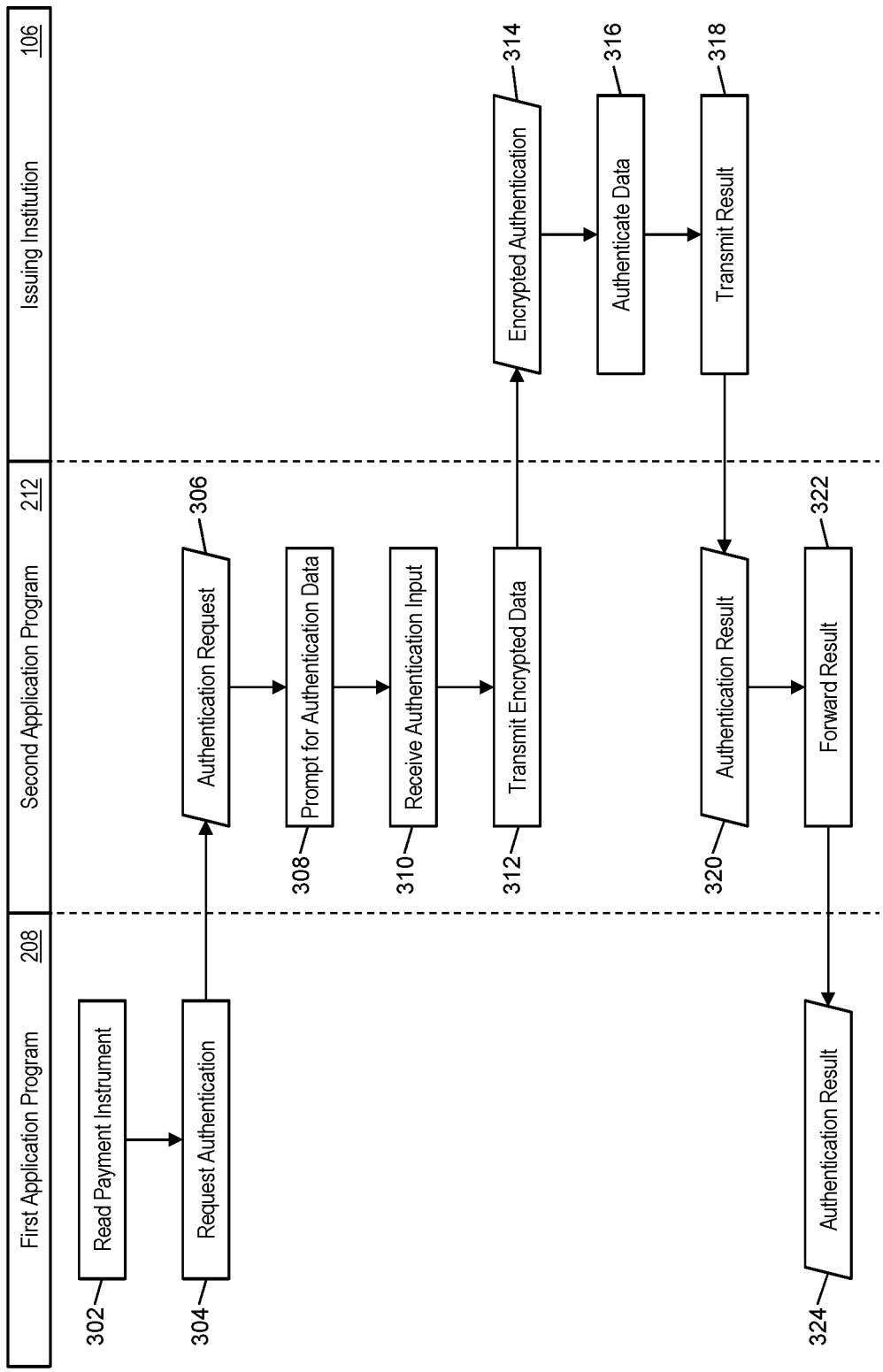
FIG. 3 is a flow diagram illustrating a process for authentication via a trusted execution environment and an issuing institution in the system of FIG. 1 in accordance with exemplary embodiments.

FIG. 3 illustrates a first process for the performing of additional authentication in a payment transaction via the use of a trusted execution environment 210, where the authentication result is determined by an issuing institution 106.

In step 302, the first application program 208 of the computing device 102 may read (e.g., via the instrument reading device 218) payment credentials from the payment instrument 104. The payment credentials may include at least a primary account number and any other additional data that may be used in the processing of a payment transaction. The first application program 208 may, reading the payment credentials, determine that additional authentication needs to be performed, such as based on criteria received from an associated issuing institution 106 (e.g., identified via the primary account number, such as using an issuing identification number included therein) and transaction data for a payment transaction being attempted. In step 304, the first application program 208 may request for additional authentication to be performed, by submitting an authentication request to the second application program 212 of the computing device 102. The authentication request may be encrypted and may be transmitted using suitable protocols associated with the trusted execution environment 210.

In step 306, the second application program 212 may receive the authentication request, which may be decrypted for identification of the data included therein. The authentication request may include at least the primary account number included in the payment credentials read by the first application program 208. In step 308, the second application program 212 may instruct the display device 216 interfaced with the computing device 102 to prompt the consumer to supply authentication data. In step 310, the second application program 212 may receive authentication data input into the computing device 102 by the consumer via an input device 214 interfaced therewith. In step 312, the second application program 212 may encrypt the primary account number and input authentication data, and may instruct the transmitting device 220 of the computing device 102 to electronically transmit the encrypted data to the issuing institution 106, either directly or via one or more intermediate entities (e.g., the acquiring institution 108, payment network 110, etc.).

In step 314, the issuing institution 106 may receive the encrypted data, which may be decrypted upon receipt to obtain the primary account number and the authentication data supplied by the consumer. In step 316, the issuing institution 106 may authenticate the supplied authentication data, such as by comparing it to data registered with the transaction account corresponding to the received primary account number, where the authentication may yield a positive result if the data matches (e.g., the supplied fingerprint matches a previously registered fingerprint) and a negative result if the data does not match (e.g., a supplied personal identification number is different from a previously registered personal identification number). In step 318, the issuing institution 106 may electronically transmit the result of the authentication to the second application program 212. In an exemplary embodiment, the result may be encrypted in compliance with the second application program's storage in the trusted execution environment 210.

In step 320, the second application program 212 may receive (e.g., and decrypt, as required) the authentication result. In step 322, the second application program 212 may forward the authentication result to the first application program 208. In step 324, the first application program 208 may receive the authentication result, which may then be used in resolution of the payment transaction.

Second Process for Authentication of a Payment Transaction

Figure 4:
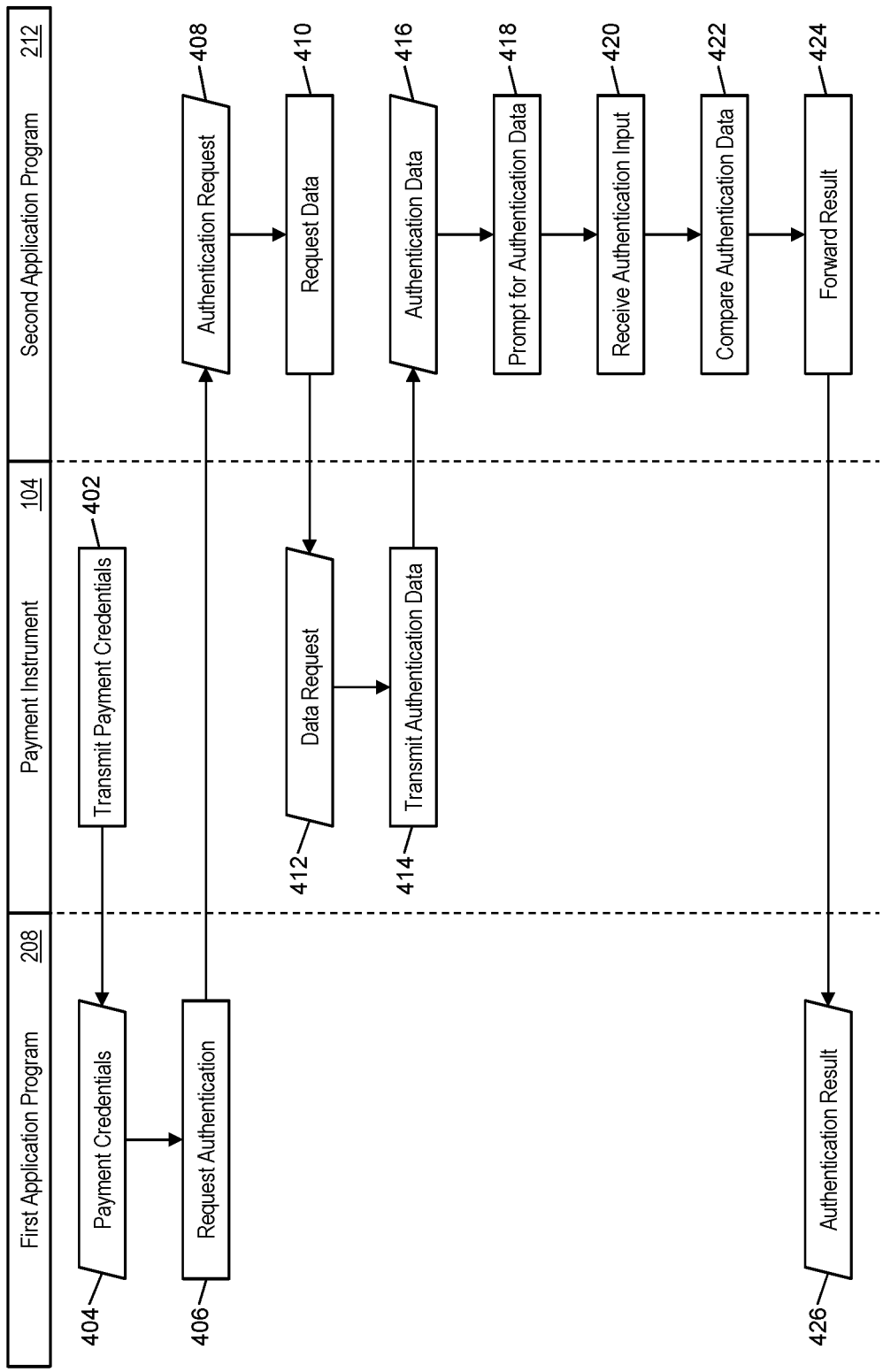
FIG. 4 is a flow diagram illustrating a process for authentication via a trusted execution environment and a payment instrument in the system of FIG. 1 in accordance with exemplary embodiments.

FIG. 4 illustrates a second process for the performing of additional authentication in a payment transaction via the use of a trusted execution environment 210, where the authentication result is determined by the second application program 212 using data provided by the payment instrument 104.

In step 402, the payment instrument 104 may provide payment credentials to the first application program 208 of the computing device 102 via the instrument reading device 218 interfaced therewith. The payment credentials may include a primary account number and any additional data used in the processing of a payment transaction. In step 404, the first application program 208 may receive the payment credentials, and may determine that additional authentication needs to be performed, such as based on criteria received from an associated issuing institution 106 (e.g., identified via the primary account number, such as using an issuing identification number included therein) and transaction data for a payment transaction being attempted. In step 406, the first application program 208 may request for additional authentication to be performed, by submitting an authentication request to the second application program 212 of the computing device 102. The authentication request may be encrypted and may be transmitted using suitable protocols associated with the trusted execution environment 210.

In step 408, the second application program 212 may receive the authentication request, which may be decrypted for identification of the data included therein. The authentication request may include at least the primary account number included in the payment credentials read by the first application program 208. In step 410, the second application program 212 may submit a request, via the instrument reading device 218 of the computing device 102, to the payment instrument 104 for authentication data to be used in the additional authentication. In step 412, the payment instrument 104 may receive the request. In step 414, the payment instrument 104 may transmit the authentication data stored therein to the second application program 212 via the instrument reading device 218. In step 416, the second application program 212 may receive the authentication data.

In step 418, the second application program 212 may instruct the display device 216 interfaced with the computing device 102 to prompt the consumer to supply authentication data. In step 420, the second application program 212 may receive authentication data input into the computing device 102 by the consumer via an input device 214 interfaced therewith. In step 422, the second application program 212 may compare the authentication data received from the payment instrument 104 to the authentication data input by the consumer to determine if the data matches, where the comparison yields an authentication result. In step 424, the second application program 212 may forward the authentication result to the first application program 208. In step 426, the first application program 208 may receive the authentication result, which may then be used in resolution of the payment transaction.

Figure 5:
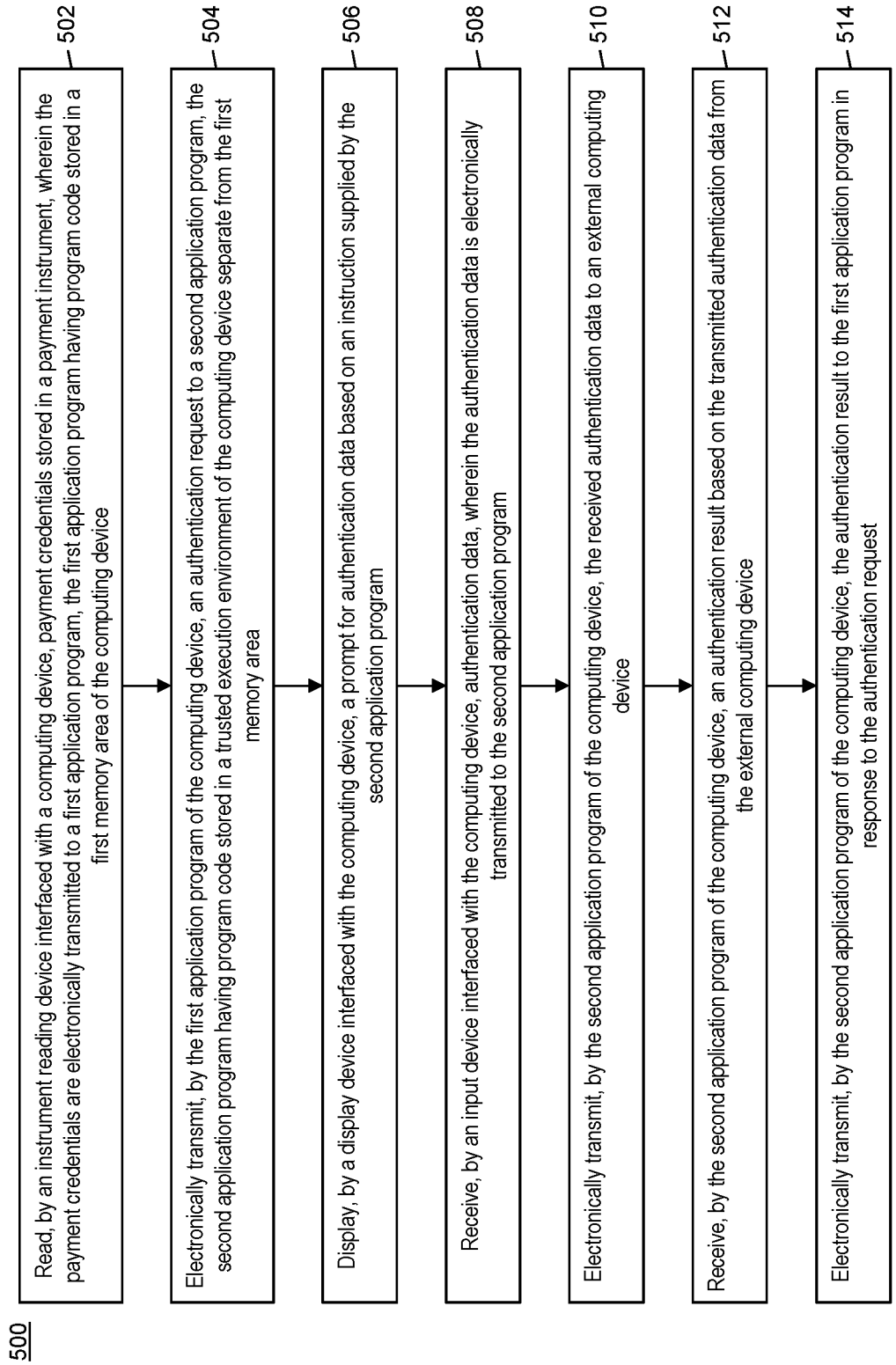
FIG. 5 is a flow chart illustrating an exemplary method for authentication facilitated via a trusted execution environment in accordance with exemplary embodiments.

Exemplary Method for Authentication Facilitated Via a Trusted Execution Environment FIG. 5 illustrates a method 500 for the authentication of a payment instrument for a payment transaction utilizing multiple application programs including one stored in a trusted execution environment of a computing device.

In step 502, payment credentials stored in a payment instrument (e.g., the payment instrument 104) may be read by an instrument reading device (e.g., the instrument reading device 218) interfaced with a computing device (e.g., the computing device 102), wherein the payment credentials are electronically transmitted to a first application program (e.g., the first application program 208), the first application program having program code stored in a first memory area (e.g., the memory 206) of the computing device. In step 504, an authentication request may be electronically transmitted by the first application program of the computing device to a second application program (e.g., the second application program 212), the second application program having program code stored in a trusted execution environment (e.g., the trusted execution environment 210) of the computing device separate from the first memory area.

In step 506, a prompt for authentication data may be displayed by a display device (e.g., the display device 216) interfaced with the computing device based on an instruction supplied by the second application program. In step 508, authentication data may be received by an input device (e.g., the input device 214) interfaced with the computing device, wherein the authentication data is electronically transmitted to the second application program.

In step 510, the received authentication data may be electronically transmitted by the second application program of the computing device to an external computing device (e.g., the issuing institution 106, payment instrument 104, etc.). In step 512, an authentication result may be received by the second application program of the computing device based on the transmitted authentication data from the external computing device. In step 514, the authentication result may be electronically transmitted by the second application program of the computing device to the first application program in response to the authentication request.

In one embodiment, the received authentication data may not be transmitted to or accessible by the first application program. In some embodiments, the method 500 may further include encrypting, by the second application program of the computing device, the received authentication data prior to electronic transmission to the external computing device, wherein the received authentication data is encrypted using a private key of a key pair, the private key being stored in the trusted execution environment. In one embodiment, the prompt for authentication data may be visually different from displays based on data supplied by the first application program. In some embodiments, the authentication data may include at least one of: fingerprint data, retinal scan data, facial scan data, vocal recognition data, personal identification number, and username and password.

In one embodiment, the external computing device may be the payment instrument, and communication between the payment instrument and the second application program may utilize the instrument reading device. In a further embodiment, the communication between the payment instrument and the second application program may be encrypted. In some embodiments, second authentication data may be received in place of the authentication result, and the second application program of the computing device may be configured to generate the authentication result based on comparison of the received authentication data to the second authentication data.

Computer System Architecture

Figure 6:
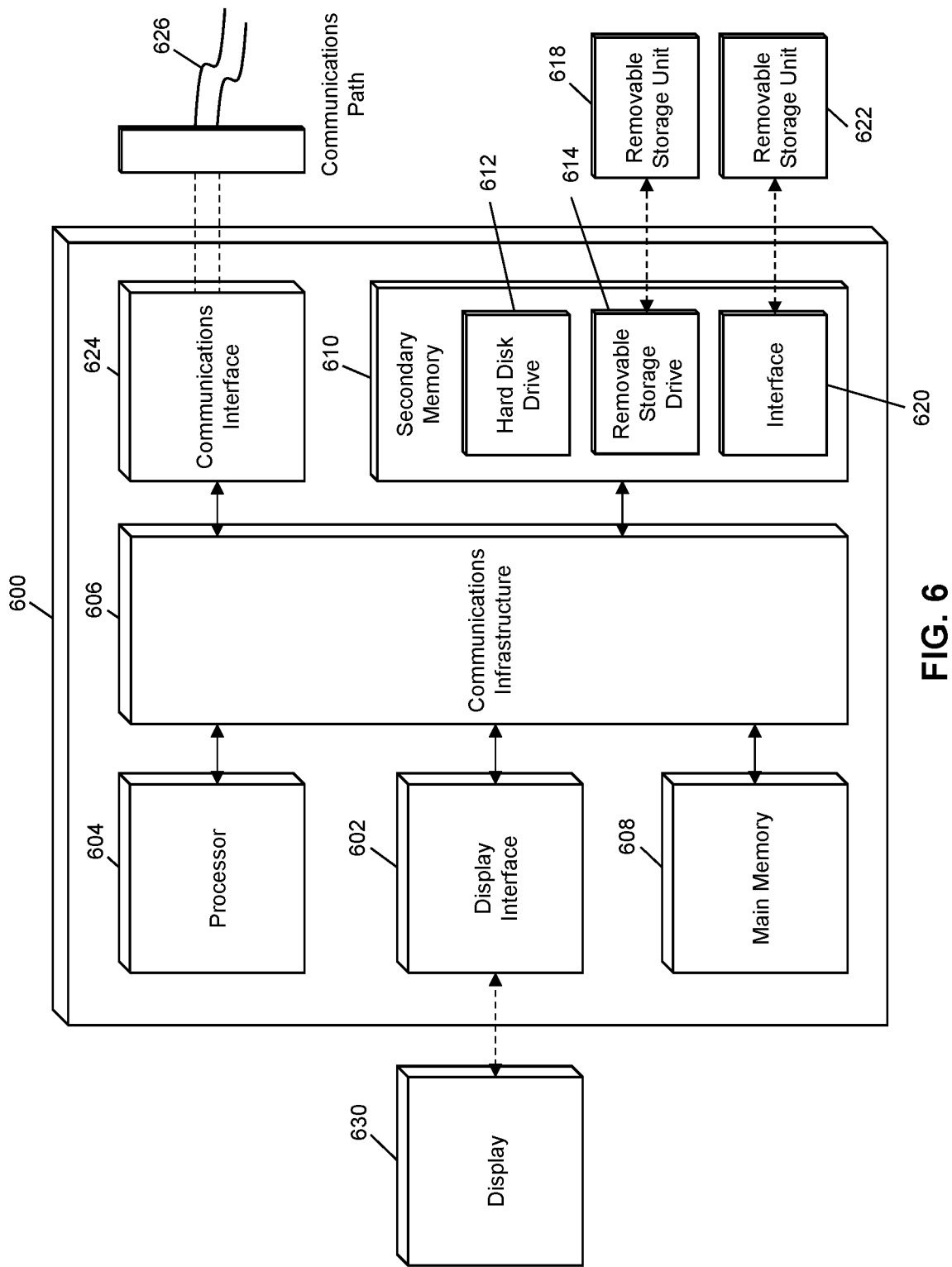
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the computing device 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for authentication facilitated via a trusted execution environment. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for authentication facilitated via a trusted execution environment, comprising:
reading, by an instrument reading device associated with a computing device, payment credentials stored in a payment instrument, wherein (i) the instrument reading device is one of a hardware component of the computing device and a hardware device electronically coupled to the computing device, and (ii) the payment credentials are electronically transmitted to a first application program that is associated with the instrument reading device, the first application program having program code stored in a first memory area of the computing device;
determining, by the computing device, whether additional authentication is required; and
in response to determining that additional authentication is required,
encrypting, by the computing device, using a first key of a key pair, an authentication request including the payment credentials read by the instrument reading device,
electronically transmitting, by the first application program of the computing device, the encrypted authentication request to a second application program, the second application program having program code stored in a trusted execution environment of the computing device separate from the first memory area, said trusted execution environment being a secure element,
decrypting, by the second application program stored in the trusted execution environment of the computing device, the authentication request using a second key of the key pair,
prompting, by the second application program stored in the trusted execution environment of the computing device, via a display screen, a user to provide authentication data, wherein prompts and interface elements associated with the second application program are visually distinguishable from prompts and interface elements associated with the first application program,
receiving, by an input device interfaced with the computing device, authentication data, wherein the authentication data is electronically transmitted to the second application program in the trusted execution environment of the computing device, wherein the authentication data is inaccessible by the first area of memory,
electronically transmitting, by the second application program of the computing device, the received authentication data to an external computing device,
receiving, by the second application program of the computing device, an authentication result based on the transmitted authentication data from the external computing device, and
electronically transmitting, by the second application program of the computing device, the authentication result to the first application program in response to the authentication request.

2. The method of claim 1, further comprising:
encrypting, by the second application program of the computing device, the received authentication data prior to electronic transmission to the external computing device, wherein the received authentication data is encrypted using a private key of a key pair, the private key being stored in the trusted execution environment.

3. The method of claim 1, wherein
the external computing device is the payment instrument, and
communication between the payment instrument and the second application program utilizes the instrument reading device.

4. The method of claim 3, wherein the communication between the payment instrument and the second application program is encrypted.

5. The method of claim 1, wherein
second authentication data is received in place of the authentication result, and
the second application program of the computing device is configured to generate the authentication result based on comparison of the received authentication data to the second authentication data.

6. The method of claim 1, wherein the authentication data includes at least one of: fingerprint data, retinal scan data, facial scan data, vocal recognition data, personal identification number, and username and password.

7. A system for authentication facilitated via a trusted execution environment, comprising:
an instrument reading device associated with a computing device configured to read payment credentials stored in a payment instrument, wherein the instrument reading device is one of a hardware component of the computing device and a hardware device electronically coupled to the computing device, wherein the computing device determines whether additional authentication is required;
a first application program, of the computing device, said first application program being associated with the instrument reading device and being configured to receive the read payment credentials from the instrument reading device, in response to the computing device determining that additional authentication is required, encrypt, using a first key of a key pair, an authentication request including the payment credential read by the instrument reading device, and electronically transmit the encrypted authentication request to a second application program, wherein the first application program has program code stored in a first memory area of the computing device, and the second application program (i) has program code stored in a trusted execution environment of the computing device separate from the first memory area, said trusted execution environment being a secure element, and (ii) decrypts the authentication request using a second key of the key pair; and a display device interfaced with the computing device, wherein the second application program, stored in the trusted execution environment of the computing device, prompts, via the display device, a user to provide authentication data, wherein said prompts and interface elements associated with the second application program are visually distinguishable from prompts and interface elements associated with the first application program, wherein the system further comprises:

an input device interfaced with the computing device configured to receive input of the authentication data, wherein the authentication data is electronically transmitted to the second application program in the trusted execution environment of the computing device, wherein the authentication data is inaccessible by the first area of memory, wherein the second application program is configured to electronically transmit the received authentication data to an external computing device, receive an authentication result based on the transmitted authentication data from the external computing device, and electronically transmit the authentication result to the first application program in response to the authentication request.

8. The system of claim 7, wherein the second application program of the computing device is further configured to encrypt the received authentication data prior to electronic transmission to the external computing device, wherein the received authentication data is encrypted using a private key of a key pair, the private key being stored in the trusted execution environment.

9. The system of claim 7, wherein the external computing device is the payment instrument, and communication between the payment instrument and the second application program utilizes the instrument reading device.

10. The system of claim 9, wherein the communication between the payment instrument and the second application program is encrypted.

11. The system of claim 7, wherein second authentication data is received in place of the authentication result, and the second application program of the computing device is configured to generate the authentication result based on comparison of the received authentication data to the second authentication data.

12. The system of claim 7, wherein the authentication data includes at least one of: fingerprint data, retinal scan data, facial scan data, vocal recognition data, personal identification number, and username and password.

\* \* \* \* \*